July 30, 1968     W. WAGNER     3,394,727
METHOD AND MEANS OF TAPPING A LINE
Filed April 13, 1964                                  2 Sheets-Sheet 1
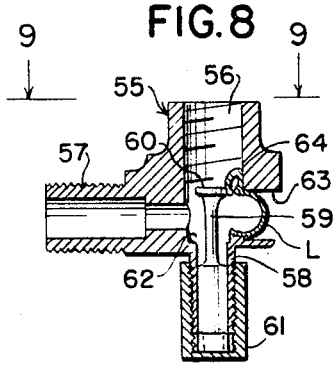
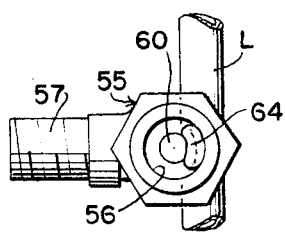
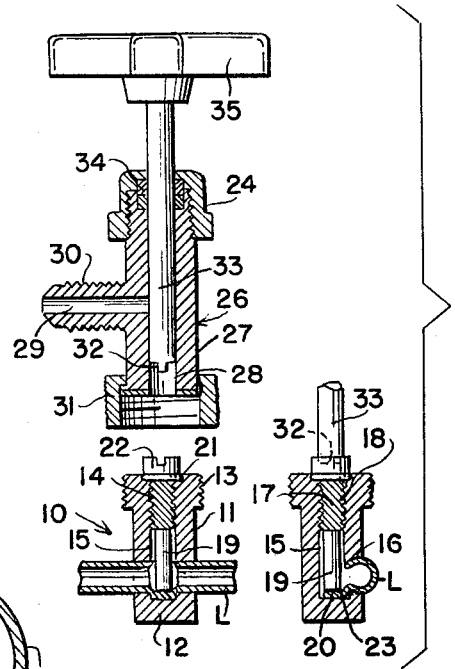
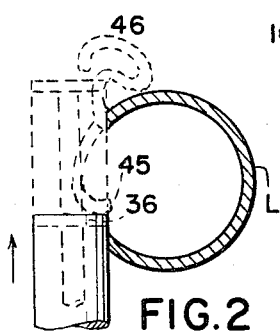
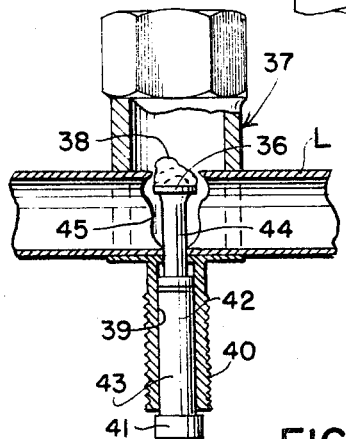
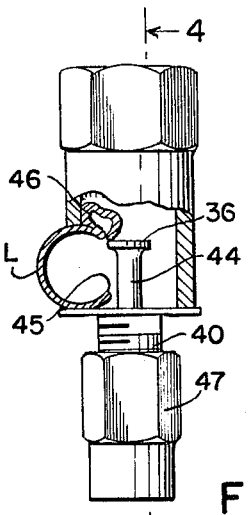
INVENTOR.
WILLIAM WAGNER
ATTORNEY July 30, 1968     W. WAGNER     3,394,727
METHOD AND MEANS OF TAPPING A LINE
Filed April 13, 1964     2 Sheets-Sheet 2
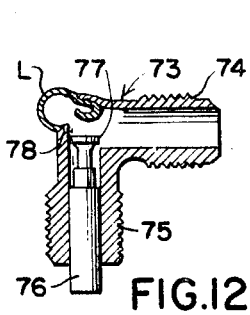
FIG.12
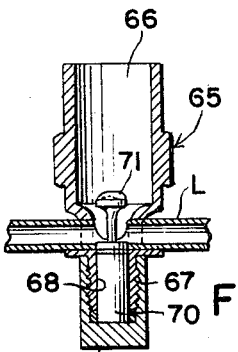
FIG.10
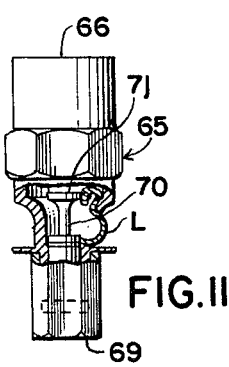
FIG.11
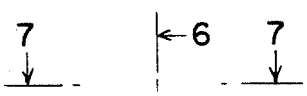
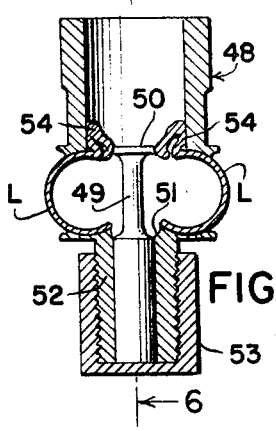
FIG.5
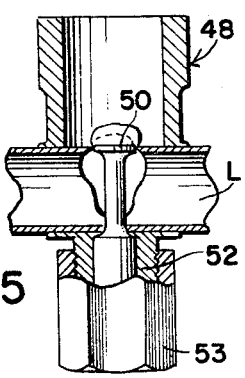
FIG.6
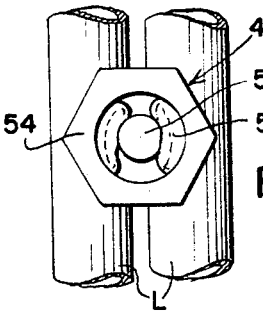
FIG.7
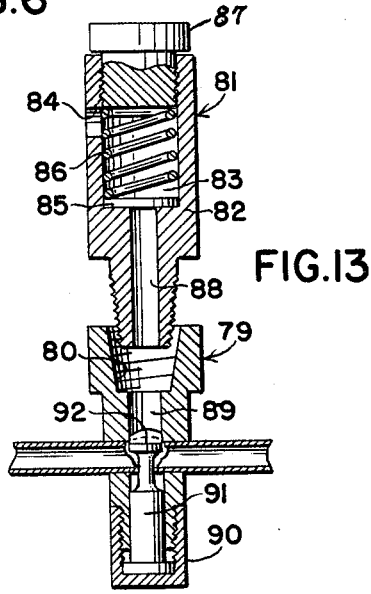
FIG.13
INVENTOR.
WILLIAM WAGNER
by *[signature]*
ATTORNEY.

United States Patent Office 3,394,727
Patented July 30, 1968

3,394,727
METHOD AND MEANS OF TAPPING A LINE
William Wagner, Miami Beach, Fla., assignor to
Watsco, Inc., Hialeah, Fla.
Filed Apr. 13, 1964, Ser. No. 359,105
1 Claim. (Cl. 137—318)

This invention relates to a method and means of tapping a line of relatively malleable tubing such as copper, so that the tapping operation will not leave any burrs or other obstructions in the line to interfere with the flow of the contents of the pipe, and further, so that even the tapping tool itself would not constrict the passage and thereby obstruct the flow therethrough.

A particular object of the invention is to apply a fitting or adapter to the line at the place to be opened and then shear an opening in the line at such point and in such manner that the piece being cut out will be deposited on the outside of the line.

A further object of the invention is to employ a method of cutting that is quick and reliable, will not deposit any material in the line and can be used with a variety of fittings or adapters for various purposes and for use under varying conditions as required.

A still further object of the invention is to provide, in an adapter or fitting of the character referred to, seat or saddle means for the tube to which the adapter or fitting is applied so that in seating, the side of the tube to be sheared is automatically adjusted to the proper distance from the cutting tool.

Other objects of the invention are the provision of means for cutting material chordally out of a tube with a tool that, in one form, acts as a closure to seal the hole as it is being cut; to provide means for applying a single adapter or fitting to a plurality of adjacent conduits, employing a single cutter to open said conduits concurrently; and to provide adapters and fittings of various configurations and many uses; and also adapters and fittings of such design and proportions as would preclude extending any appreciable distance from the line.

With these and other objects in view, the invention comprises certain constructions hereinafter described and then particularly pointed out in the claims and preferred embodiments of the invention are illustrated in the accompanying drawings, in which:

FIGURE 1 is an exploded view of a tapping fitting or adapter and an operating tool therefor, the fitting being adapted for use with a tube or line of the type used in refrigeration and air conditioning systems.

FIGURE 2 is an enlarged detail view showing how the cutter acts on a tube to open the same so that the material cut therefrom does not obstruct the passage of fluid or gas therethrough.

FIGURE 3 is a side view of a fitting applied to a line showing the cutting means at the end of a line cutting operation.

FIGURE 4 is an exploded view of said fitting taken substantially on the line 4—4 of FIGURE 3, the cutting means being illustrated at the end of its working stroke.

FIGURE 5 is a view in section of a fitting or adapter applied to two lines to provide communication between them.

FIGURE 6 is a section taken on the line 6—6 of FIGURE 5.

FIGURE 7 is a plan view of the fitting and a section of the tapped lines taken on the line 7—7 of FIGURE 5.

FIGURE 8 is a view in section through an elbow-shaped fitting or adapter providing a double outlet from a single line.

FIGURE 9 is a plan view of the adapter of FIGURE 8 taken on the line 9—9 of FIGURE 8.

FIGURE 10 is a view in cross-section taken through another fitting or adapter providing an enlarged outlet.

FIGURE 11 is a side view, partly in section, of the adapter shown in FIGURE 10.

FIGURE 12 is a sectional view of an adapter or fitting of elbow design.

FIGURE 13 is a vertical section through a pressure relief valve applied to a line, in accordance with the present invention, some parts being shown in exploded relationship.

Referring to the drawings in detail and in particular to FIGURE 1, 10 indicates a fitting or adapter, which is to be applied to a tube or line L which is to be tapped for the purpose of charging or discharging the line contents as in refrigeration practice, or for other line tapping purposes, and consists of a cylindrical body portion 11 having one end closed as at 12 and the opposite end externally threaded as at 13 and internally threaded as at 14 in the outlet end of a bore 15. The body 11 is laterally milled or drilled or otherwise provided with a tangential groove or hole 16 to receive line L to be tapped, the latter being soldered or otherwise securely held in said groove or hole 16 so that its inner wall extends into the bore 15 a predetermined distance dictated by the desired depth of the cut. This fitting can be applied at any desired point on the line where the latter is to be tapped.

The internal thread 14 is arranged to receive the threaded shank 17 of a tapping or cutting tool 18 which has extending therefrom a reduced shank portion 19 terminating an end portion 20 provided with a sharp shearing circumferential edge. The external end of the tapping tool is flanged as at 21 and shaped to provide a slotted head 22 for engagement with a screw driver type of actuating tool. The tapping tool can thereby be rotated and caused to bear against the line tangentially in order to shear a flap 23 out of that side of the line which projects into bore 15. It will be particularly noted that the path of movement of the tapping tool extends in spaced or offset parallel relation to the diameter of the line. The shearing action, as shown in FIGURE 2, will accordingly be directed away from the center of the line, with the result that flap 23 will be prevented from lodging within the line and forming a restriction therein. This action will be clearly shown in the other forms of the device and is one of the major advantages to be derived from the invention.

When it is desired to tap the line L, a tapping device 26 is used which consists of a cylindrical body 27 having a central bore 28 and a side outlet bore 29 leading therefrom and to whose threaded extension 30, a tube or other conduit or fitting may be secured. At its lower end the body 27 is flanged to carry loosely a knurled connector sleeve 31 for threaded engagement with the external thread 13 on the body portion 11 of the tapping tool 18. This positions the screw driving end 32 of a spindle 33 for engagement with the screw head 22 of the tapping tool 18. The spindle 33 may be held frictionally in bore 28 by suitable sealing washers 34 which are secured by a cap 24 threadedly engaging the top of body 27, and the spindle can be rotated manually by means of knob in order to rotate and drive the tapping tool into cutting engagement with the line as above described. This action is further exemplified diagrammatically in FIGURE 2 in which shank 19 of the tapping tool 18 is provided with a cutting portion 36 which rolls back the material of the line L as it cuts through said line.

This form of the invention is seen in FIGURES 3 and 4 wherein the line L is soldered or otherwise secured in a bore seat in one side of a fitting 37 having a bore 38 communicating with an axial bore 39 in an exteriorly threaded sleeve 40. The sleeve has frictionally held therein, by a suitable rubber gasket, the cylinder portion 42 of a tapping tool 43. This tapping tool has a shank 44 terminating in a cutting end 36 and on the lower protruding end is a rubber cushioning sleeve 41. In FIGURE 4 the action of the cutting end 36 is as shown in FIGURE 2 and a portion of the wall of line L is cut out as at 45 and rolled up outside the line as at 46. This action of the tapping tool 43 is caused by the operation of a threaded cap 47 which is screwed over the sleeve 40 and rotated to apply an axial thrust or pressure to the sleeve end 41.

In FIGURES 5, 6 and 7 the use of the fitting illustrated in FIGURES 3 and 4, is shown in connection with two spaced parallel lines L. A fitting 48 similar to that shown in FIGURES 3 and 4 is laterally milled at opposite sides to have the lines L fitted and seated therein and soldered in place. It is understood that the fitting 48 is applied to the line at any selected location where it is desired to tap and connect the two lines. A tapping tool 49 having a cutting end 50 will initially be in its lowermost position in a seat 51 formed in the sleeve portion 52 of the fitting. When a cap 53 threaded to said sleeve 52 is advanced along the sleeve it will drive the tapping tool 49 into cutting contact with both lines simultaneously to cut out opposing wall portions thereof as indicated at 54.

In FIGURES 8 and 9 the tapping device 55 may take the form of a double outlet adapter in which the fitting has threaded orifices or passages 56 and 57 arranged at right angles to each other. The fitting has an externally threaded stem 58 housing a tapping tool 59 having, if desired, a flat cutting end 60. Again, the tapping tool is forced into cutting engagement with the line by means of a cap 61 threaded to said stem 58. The cutting end 60 of tapping tools 59, before cutting an opening in the line L, rests in a seat 62 formed in the fitting. As in some of the other forms of the invention, the fitting is provided with a recess 63 for receiving the line L which is soldered or otherwise secured in place. The wall portion that has been cut out of the line by tapping tool 59 is designated as at 64.

FIGURES 10 and 11 show how the line L can be tapped to provide a relatively large diameter outlet leading from a relatively small diameter line. The fitting 65 has an outlet 66 and a reduced stem portion 67 provided with an opening 68 for seating the line L which is soldered or otherwise secured in place. The threaded stem 67 on the fitting constitutes a housing in which a tapping tool 70, having a cutting end portion 71, operates to cut an opening in the inner side wall of the line L, as the cap 69 is threaded on the stem 67 and seals with a gasket 72.

In FIGURE 12 the fitting 73 takes the form of an elbow having threaded stems 74 and 75, the latter of which houses a tapping tool 76 having a flat cutting end 77 and driven by the usual threaded cap, not shown. The corner of the elbow is laterally recessed to provide a seat 78 into which the line L may be secured.

As an illustration of the use of the line tap valve, reference is made to FIGURE 13 in which a fitting or adapter 79 presents an upper internally threaded sleeve 80 for the reception of a pressure relief valve 81. This valve is provided with the usual housing 82 having an inner chamber 83 and a side outlet 84. The chamber 83 contains a closure disc 85 and a coil spring 86 which is tensionally adjustable by means of a screw plug 87. This closes the chamber at one end. The opposite end of the chamber opens into a bore 88 which communicates with a vertical bore 89 in the fitting 79. The side of the fitting is recessed to provide a seat for the line L which is secured therein. The outer end of the fitting is closed by means of an adjusting cap 90 which drives a tapping tool 91 having a cutting end 92. Said cutting end 92 is thereby caused to cut into that portion of the line L that projects into the recess 89. When the line L is thus tapped, excessive pressure therein may be relieved, if such pressure is beyond the set pressure of the relief valve.

It is evident therefore that the present invention makes it possible to tap a refrigeration or air conditioning or other line at any desired location and for any desired purpose, such as charging or discharging the refrigerant or extending the system or installing fittings or attachments. All of this can be done without severing and splicing the line without leaking its contents, and without special tools or equipment.

The invention is not to be restricted to the precise details of construction shown since various changes and modifications may be made therein without departing from the scope of the invention or sacrificing the advantages to be derived from its use.

What is claimed is:

1. A line tapping tool, comprising a body member adapted to be secured to a line, and a rotatable cutter movably mounted in said body member for cutting engagement with the wall of said line, the path of movement of said cutter being in spaced parallel relation to the diameter of said line to enable the cutter to remove a chordal section of wall therefrom, said body member having a bore formed therein for the cutter and a recess formed therein to receive a line, said bore and said recess being in intersecting communication with each other, said cutter being movably mounted within said bore for cutting engagement with that wall portion of the line which extends into said bore, said body member further having a second recess formed therein in parallel relation to said first recess to receive a second line, said second recess being also in intersecting communication with said bore in diametrically opposite relation to the first recess, said cutter being movably mounted within the bore for cutting engagement with the wall portions of both lines which extend into said bore.

References Cited
UNITED STATES PATENTS

| | | | |
|---|---|---|---|
| 2,287,354 | 6/1942 | Misch | 77—37 |
| 2,297,013 | 9/1942 | Nichols et al. | 29—157 |
| 3,120,143 | 2/1964 | Kreider | 30—92 X |
| 1,907,188 | 5/1933 | Ransdell et al. | 137—318 |
| 2,827,913 | 3/1958 | Wagner | 137—318 |
| 3,198,206 | 8/1965 | O'Brien | 137—318 |

WILLIAM F. O'DEA, *Primary Examiner.*

D. R. MATTHEWS, *Assistant Examiner.*